(12) United States Patent  
Zhang et al.

(10) Patent No.: US 11,705,614 B2  
(45) Date of Patent: Jul. 18, 2023

(54) COUPLING DEVICE AND ANTENNA

(71) Applicant: CommScope Technologies LLC, Hickory, NC (US)

(72) Inventors: Jian Zhang, Suzhou (CN); Bo Wu, Suzhou (CN); Xun Zhang, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/823,442

(22) Filed: Aug. 30, 2022

(65) Prior Publication Data

US 2022/0416397 A1  Dec. 29, 2022

Related U.S. Application Data

(63) Continuation of application No. 16/748,953, filed on Jan. 22, 2020, now Pat. No. 11,462,811.

(30) Foreign Application Priority Data

Feb. 1, 2019  (CN) .......................... 201910101555.8

(51) Int. Cl.
*H01P 5/18* (2006.01)
*H01Q 21/00* (2006.01)
(Continued)

(52) U.S. Cl.
CPC .............. *H01P 5/184* (2013.01); *H01P 5/185* (2013.01); *H01Q 3/2605* (2013.01);
(Continued)

(58) Field of Classification Search
CPC ........ H01Q 21/0006; H01P 5/12; H01P 5/185
See application file for complete search history.

(56) References Cited

U.S. PATENT DOCUMENTS 8,798,561 B2    8/2014  Acimovic
11,462,811 B2 * 10/2022  Zhang ................. H01Q 3/2605
(Continued)

FOREIGN PATENT DOCUMENTS

CN          101213705 A       7/2008
CN          104810584 A       7/2015
(Continued)

OTHER PUBLICATIONS

"Extended European Search Report corresponding to European Patent Application No. 20154390.7 (9 pages) (dated Jun. 17, 2020)".

(Continued)

*Primary Examiner* — Jason Crawford
(74) *Attorney, Agent, or Firm* — Myers Bigel, P.A.

(57) ABSTRACT

A coupling device includes a plurality of couplers, a first coupled output port and a second coupled output port, wherein the plurality of couplers comprise a first coupler and a second coupler that are adjacent one another, and each of the first coupler and the second coupler comprises a main line and a subline, and for each of the first coupler and the second coupler: the subline includes a first section, a second section, and a third section, wherein the second section of the subline of the first coupler has a common segment with the first section of the subline of the second coupler.

10 Claims, 7 Drawing Sheets

(51) Int. Cl.
  *H04B 17/12*    (2015.01)
  *H04B 17/21*    (2015.01)
  *H01Q 3/26*     (2006.01)
(52) U.S. Cl.
  CPC ......... *H01Q 3/267* (2013.01); *H01Q 21/0006* (2013.01); *H04B 17/12* (2015.01); *H04B 17/21* (2015.01)

(56) References Cited

U.S. PATENT DOCUMENTS

| | | | |
|---|---|---|---|
| 2006/0091974 A1 | 5/2006 | Feldman | |
| 2011/0267194 A1* | 11/2011 | Hong | H01P 5/185 333/109 |
| 2013/0260844 A1 | 10/2013 | Rucki et al. | |
| 2014/0285283 A1* | 9/2014 | Blodt | H01P 5/185 333/116 |
| 2018/0351228 A1* | 12/2018 | Kim | H03H 9/70 |
| 2019/0372221 A1* | 12/2019 | Wu | H01Q 3/36 |
| 2020/0251800 A1* | 8/2020 | Zhang | H01Q 21/0006 |
| 2021/0378091 A1* | 12/2021 | Wang | H01P 5/185 |
| 2022/0061160 A1* | 2/2022 | Wang | H01Q 21/24 |
| 2022/0231415 A1* | 7/2022 | Wu | H04B 17/21 |
| 2022/0416397 A1* | 12/2022 | Zhang | H04B 17/21 |

FOREIGN PATENT DOCUMENTS

| | | |
|---|---|---|
| CN | 209571537 U | 11/2019 |
| DE | 3318520 A1 | 4/1984 |
| EP | 0291694 A1 | 11/1988 |
| EP | 0639902 A1 | 2/1995 |
| WO | 2012162972 A1 | 12/2012 |
| WO | 2017202536 A1 | 11/2017 |

OTHER PUBLICATIONS

"Notification of First Office Action in corresponding patent application No. 201910101555.8 dated Jun. 6, 22, 10 pages".
Cai, et al., ""Miniaturized and Folded Multisection Quadrature Hybrid for UWB Applications," Progress in Electromagnetics Research Letters, 79:129-133 (2018)".

* cited by examiner

COUPLING DEVICE AND ANTENNA

CROSS-REFERENCE TO RELATED APPLICATION

The present application is a continuation of claims priority to U.S. patent application Ser. No. 16/748,953, filed Jan. 22, 2020, which claims priority to Chinese Paten Application No. 201910101555.8, filed Feb. 1, 2019, the entire contents of which are incorporated herein by reference.

FIELD

The present invention generally relates to the field of wireless communication technologies. More specifically, the present invention relates to a coupling device and an antenna including a coupling device.

BACKGROUND

With the introduction of fifth generation cellular technologies, the use of beamforming radios in cellular communication systems is becoming more common. As shown in FIG. 7, a cellular base station having beamforming capabilities may include a beamforming radio 720 that includes a beamforming unit 760. The beamforming radio 720 may output a radio frequency ("RF") signal that is to be transmitted through multiple RF ports of the radio 720. The sub-components of the RF signal that are output through each port may have different phases, where the phase of each sub-component is set by the beamforming radio 720 in a manner that will shape the antenna beam that is formed by an antenna 700 that is connected to the radio in a desired fashion.

As shown in FIG. 7, the antenna 700 may include a radiating array 710 (i.e., a plurality of phase controlled radiating elements) and a feed network 750 that is configured to feed the sub-components of the RF signal output by the radio 720 to the radiating array 710. The feed network 750 may also perform additional functions such as changing the downtilt angle of a signal emitted by the antenna 700 by means of a phase shifter or the like. A signal from the radio 720 enters the feed network 750 via a plurality of RF ports 770 on the antenna, and the feed network 750 feeds the sub-components of the RF signal to, for example respective columns of radiating elements in the radiating array 710 for transmission.

The beamforming unit 760 sets the phases of the sub-components of the RF signal that is to be transmitted in a manner so that the sub-components, when transmitted through the antenna 700, constructively combine in directions where high antenna gains are desired and the sub-components destructively combine in directions where low antenna gains are desired. If the actual phases of the sub-components of the RF signal, when arriving at the radiating elements, are different than the desired phases (due to, for example, unintended variations in the lengths of the RF transmission paths between the radio 720 and the radiating array 710), then the antenna beam formed by the radiating array 710 may have a degraded shape, and the performance of the cellular base station may be degraded. In order to reduce or eliminate such unintended variations in phase, an antenna calibration device (not shown) may be used to determine the variations in phase along each of the RF transmission paths and this information may be passed to the beamforming unit 760 so that the phases of the RF sub-components output by the radio 720 may be calibrated to take into account the determined phase variations.

The antenna may include a coupling device in the form of a series of RF couplers that couple a small amount of the RF energy from each RF transmission channel in the antenna 700, and then combine the coupled signals and feed them back to the radio 720 via a calibration port (not shown) on the antenna 700.

SUMMARY

A first aspect of this invention is to provide a coupling device. The coupling device may comprise: a plurality of couplers, a first coupled output port and a second coupled output port, wherein the plurality of couplers comprise a first coupler and a second coupler that are adjacent one another, and each of the first coupler and the second coupler comprises a main line and a subline, and for each of the first coupler and the second coupler: the subline includes a first section, a second section, and a third section, wherein the first section is located on a first side of the main line and forms a first coupling unit with the main line such that a first portion of a signal passed on the main line is coupled to the first section to generate a first coupled signal, the first section is coupled to the first coupled output port and configured to pass the first coupled signal to the first coupled output port, the second section is located on a second side of the main line and forms a second coupling unit with the main line such that a second portion of a signal passed on the main line is coupled to the second section to generate a second coupled signal, the second section is coupled to the second coupled output port and configured to pass the second coupled signal to the second coupled output port, and the third section couples the first section to the second section, wherein the second section of the subline of the first coupler has a common segment with the first section of the subline of the second coupler.

A second aspect of this invention is to provide an antenna. The antenna may comprise: a plurality of radiating elements, an antenna calibration device, and the coupling device described above, wherein the main line of each of the first coupler and the second coupler in the coupling device is coupled to a radio frequency (RF) signal transmission channel for a corresponding one of the plurality of radiating elements; and at least one of the first coupled output port and the second coupled output port is coupled to the antenna calibration device.

A third aspect of this invention is to provide a coupling device for a base station antenna. The coupling device may comprise: a first coupled output port; a second coupled output port; a first coupler that includes a main line and a first subline, wherein a first section of the main line forms a first coupling unit with a first section of the first subline and forms a second coupling unit with a second section of the first subline, wherein the first coupler is configured so that first coupled signals that are coupled to the first section of the first subline through the first coupling unit pass to the first coupled output port and are substantially isolated from the second coupled output port, and so that second coupled signals that are coupled to the second section of the first subline through the second coupling unit pass to the second coupled output port and are substantially isolated from the first coupled output port.

Further features of the present invention and advantages thereof will become apparent from the following detailed description of exemplary embodiments with reference to the attached drawings.

Figure 1:
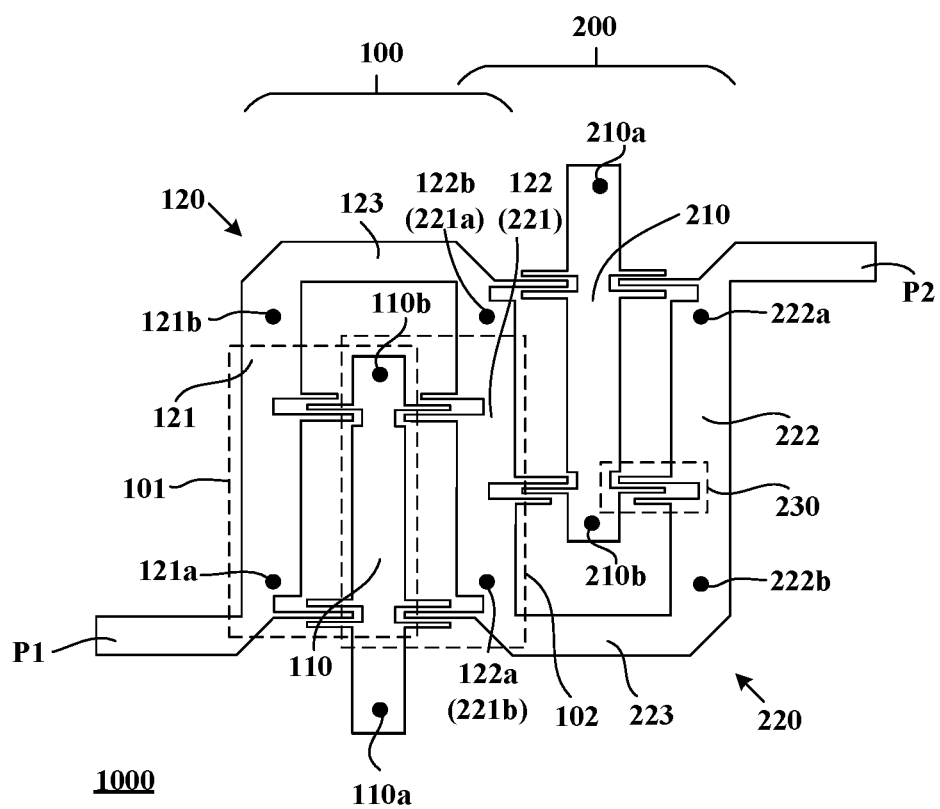
FIG. 1 schematically illustrates a configuration of a coupling device according to an exemplary embodiment of the present invention.

Note that, in some cases the same elements or elements having similar functions are denoted by the same reference numerals in different drawings, and description of such elements is not repeated. In some cases, similar reference numerals and letters are used to refer to similar elements, and thus once an element is defined in one figure, it need not be further discussed for following figures.

In order to facilitate understanding, the position, size, range, or the like of each structure illustrated in the drawings may not be drawn to scale. Thus, the invention is not necessarily limited to the position, size, range, or the like as disclosed in the drawings.

DETAILED DESCRIPTION

The present invention will be described with reference to the accompanying drawings, which show a number of example embodiments thereof. It should be understood, however, that the present invention can be embodied in many different ways, and is not limited to the embodiments described below. Rather, the embodiments described below are intended to make the disclosure of the present invention more complete and fully convey the scope of the present invention to those skilled in the art. It should also be understood that the embodiments disclosed herein can be combined in any way to provide many additional embodiments.

The terminology used herein is for the purpose of describing particular embodiments, but is not intended to limit the scope of the present invention. All terms (including technical terms and scientific terms) used herein have meanings commonly understood by those skilled in the art unless otherwise defined. For the sake of brevity and/or clarity, well-known functions or structures may be not described in detail.

Herein, when an element is described as located "on" "attached" to, "connected" to, "coupled" to or "in contact with" another element, etc., the element can be directly located on, attached to, connected to, coupled to or in contact with the other element, or there may be one or more intervening elements present. In contrast, when an element is described as "directly" located "on", "directly attached" to, "directly connected" to, "directly coupled" to or "in direct contact with" another element, there are no intervening elements present. In the description, references that a first element is arranged "adjacent" a second element can mean that the first element has a part that overlaps the second element or a part that is located above or below the second element.

Herein, the foregoing description may refer to elements or nodes or features being "connected" or "coupled" together. As used herein, unless expressly stated otherwise, "connected" means that one element/node/feature is electrically, mechanically, logically or otherwise directly joined to (or directly communicates with) another element/node/feature. Likewise, unless expressly stated otherwise, "coupled" means that one element/node/feature may be mechanically, electrically, logically or otherwise joined to another element/node/feature in either a direct or indirect manner to permit interaction even though the two features may not be directly connected. That is, "coupled" is intended to encompass both direct and indirect joining of elements or other features, including connection with one or more intervening elements.

Herein, terms such as "upper", "lower", "left", "right", "front", "rear", "high", "low" may be used to describe the spatial relationship between different elements as they are shown in the drawings. It should be understood that in addition to orientations shown in the drawings, the above terms may also encompass different orientations of the device during use or operation. For example, when the device in the drawings is inverted, a first feature that was described as being "below" a second feature can be then described as being "above" the second feature. The device may be oriented otherwise (rotated 90 degrees or at other orientation), and the relative spatial relationship between the features will be correspondingly interpreted.

Herein, the term "A or B" used through the specification refers to "A and B" and "A or B" rather than meaning that A and B are exclusive, unless otherwise specified.

The term "exemplary", as used herein, means "serving as an example, instance, or illustration", rather than as a "model" that would be exactly duplicated. Any implementation described herein as exemplary is not necessarily to be construed as preferred or advantageous over other implementations. Furthermore, there is no intention to be bound by any expressed or implied theory presented in the detailed description.

Herein, the term "substantially", is intended to encompass any slight variations due to design or manufacturing imperfections, device or component tolerances, environmental effects and/or other factors. The term "substantially" also allows for variation from a perfect or ideal case due to parasitic effects, noise, and other practical considerations that may be present in an actual implementation.

Herein, certain terminology, such as the terms "first", "second" and the like, may also be used in the following description for the purpose of reference only, and thus are not intended to be limiting. For example, the terms "first", "second" and other such numerical terms referring to structures or elements do not imply a sequence or order unless clearly indicated by the context.

Further, it should be noted that, the terms "comprise", "include", "have" and any other variants, as used herein, specify the presence of stated features, steps, operations, elements, and/or components, but do not preclude the presence or addition of one or more other features, steps, operations, elements, components, and/or groups thereof.

Embodiments of the present invention provide coupling devices that may be used in beamforming antennas. The coupling devices according to embodiments of the present invention include a plurality of couplers and one or more coupled output ports. An application of the coupling device may be, for example, coupling a portion of each sub-component of an RF signal that pass between a radio and respective groups of radiating elements of the antenna to one or more coupled output ports, where the signals coupled to the coupled output ports may be used for antenna calibration.

Each of the plurality of couplers of the coupling device according to an embodiment of the present invention may have a similar structure, such as the structure of the coupler 100 which will be described below with reference to FIG. 1. Each coupler includes an inlet and an outlet. The inlet of each coupler may be coupled to an RF signal transmission channel corresponding to the coupler in the antenna, so that at least a portion of a sub-component of an RF signal carried on the RF signal transmission channel may be coupled to the main line of the coupler via the inlet and passed to the outlet via the main line. One or more portions of an RF signal that passes on the main line may be further coupled to the subline of the coupler and passed to at least one of the coupled output ports.

FIG. 1 schematically illustrates a configuration of a coupling device 1000 according to an exemplary embodiment of the present invention. The coupling device 1000 may include two adjacent couplers 100 and 200, a first coupled output port P1, and a second coupled output port P2.

The coupler 100 may include an inlet 110a, an outlet 110b, a main line 110, and a subline 120. The inlet 110a and the outlet 110b may be coupled to a primary RF transmission path (not shown) that extends between a radio and a sub-array of one or more radiating elements. For example, a first coaxial cable may be used to connect the primary RF transmission path to the inlet 110a and a second coaxial cable may be used to connect the primary RF transmission path to the outlet 110b. The main line 110 connects between the inlet 110a to the outlet 110b. The subline 120 may include a first section 121, a second section 122, and a third section 123. The coupler 200 may include an inlet 210a, an outlet 210b, a main line 210, and a sub line 220. The main line 210 may connect the inlet 210a to the outlet 210b. The subline 220 may include a first section 221, a second section 222, and a third section 223. Since the couplers 100 and 200 have similar structures, only the coupler 100 will be described here as an example, and duplicated description of the same or similar structures in the coupler 200 will be omitted.

As shown in FIG. 1, the first section 121 and the second section 122 of the subline 120 of the coupler 100 may be on opposed sides of the main line 110 to form respective coupling units with the main line 110. For example, the first section 121 of the subline 120 may be located on a first side of the main line 110 (e.g., on the left side of the main line 110 in the view of FIG. 1) and may form a first coupling unit 101 with the main line 110 such that a first portion of an RF signal that is passed on the main line 110 may be coupled to the first section 121 as a first coupled signal. Similarly, the second section 122 may be located on a second side of the main line 110 (e.g., on the right side of the main line 110 in the view of FIG. 1) and may form a second coupling unit 102 with the main line 110 such that a second portion of the RF signal that is passed on the main line 110 may be coupled to the second section 122 as a second coupled signal.

The first section 121 may be coupled to the first coupled output port P1 and may pass the first coupled signal to the first coupled output port P1. The second section 122 may be coupled to the second coupled output port P2 and may pass the second coupled signal to the second coupled output port P2. The third section 123 of the subline 120 may connect the first section 121 to the second section 122.

The coupler 200 that is adjacent the coupler 100 may have a similar structure to the coupler 100. As shown in FIG. 1, in a pair of adjacent couplers 100 and 200, the second section 122 of the subline 120 of the first coupler 100 has a common segment with the first section 221 of the subline 220 of the second coupler 200. The arrangement between the couplers 100, 200 of the coupling device 1000 becomes more compact by having a common segment between the sublines of the adjacent couplers 100, 200, and the size of the coupling device 1000 is reduced, which may save space and cost.

Although in the example shown in FIG. 1, the second section 122 of the subline 120 of the coupler 100 substantially coincides with the first section 221 of the subline 220 of the coupler 200 (where the coincided segment is represented by reference number 122(221)), it should be understood by those skilled in the art that as long as the second section 122 has a common segment with the first section 221, the coupling device 1000 may have the advantageous effect of the present invention.

The main line 110 of the coupler 100 couples the inlet 110a to the outlet 110b such that signals may be passed from the inlet 110a to the outlet 110b via the main line 110. In the coupler 100, the first coupling unit 101 is composed of the first section 121 and the main line 110, which are close to each other and substantially parallel. The first section 121 includes a first isolated end 121b that is closer to the outlet 110b than it is to the inlet 110a and a first coupled end 121a that is closer to the inlet 110a than it is to the outlet 110b. The second coupling unit 102 is composed of the second section 122 and the main line 110, which are close to each other and substantially parallel. The second section 122 includes a second isolated end 122b that is closer to the outlet 110b than it is to the inlet 110a and a second coupled end 122a that is closer to the inlet 110a than it is to the outlet 110b.

The main line 210 of the coupler 200 couples the inlet 210a to the outlet 210b such that signals may be passed from the inlet 210a to the outlet 210b via the main line 210. In the coupler 200, the first section 221 and the main line 210, which are close to each other and substantially parallel, form a coupling unit. The first section 221 includes a first isolated end 221b that is closer to the outlet 210b than it is to the inlet 210a and a first coupled end 221a that is closer to the inlet 210a than it is to the outlet 210b. The second section 222 and the main line 210, which are close to each other and substantially parallel, form another coupling unit. The second section 222 includes a second isolated end 222b that is closer to the outlet 210b than it is to the inlet 210b and a second coupled end 222a that is closer to the inlet 210a than it is to the outlet 210b.

In the example shown in FIG. 1, since the second section 122 of the subline 120 of the coupler 100 and the first section 221 of the subline 220 of the coupler 200 substantially coincide, the second isolated end 122b in the coupler 100 substantially coincides with the first coupled end 221a of coupler 200 (represented by reference number 122b(221a)) and the second coupled end 122a in the coupler 100 substantially coincides with the first isolated end 221b of coupler 200 (represented by reference number 122a(221b)). Those skilled in the art will appreciate that the second isolated end 122b may not coincide with the first coupled end 221a and/or the second coupled end 122a may not coincide with the first isolated end 221b in other embodiments.

The sublines 120 and 220 of the couplers 100 and 200 are connected in series with each other between the first coupled output port P1 and the second coupled output port P2 of the coupling device 1000. In the specific example shown in FIG. 1, the coupler 100 is closer to the first coupled output port P1, and the coupler 200 is closer to the second coupled output port P2. The first coupled end 121a of the first section 121 of the subline 120 of the coupler 100 is coupled to the first coupled output port P1, the second coupled end 222a of the second section 222 of the subline 220 of the coupler 200 is coupled to the second coupled output port P2. The first isolated end 121b of the first section 121 of the subline 120 of the coupler 100 is coupled to the second isolated end 222b of second section 222 of subline 220 of coupler 200 sequentially through at least the third section 123 of the subline 120 of the coupler 100, the second section 122 of the subline 120 of the coupler 100, and the third section 223 of the subline 220 of the coupler 200.

In the first coupling unit 101 of the coupler 100, a first portion of a signal passed on the main line 110 from the inlet 110a to the outlet 110b is coupled to the first section 121 of the subline 120, thereby a first coupled signal is obtained on the first section 121. The first coupled signal is passed on the first section 121 in a direction from the first isolated end 121b to the first coupled end 121a, and is output to the first coupled output port P1. Similarly, in the second coupling unit 102, a second portion of the signal passed on the main line 110 from the inlet 110a to the outlet 110b is coupled to the second section 122 of the subline 120, such that a second coupled signal is obtained on the second section 122. The second coupled signal is passed on the second section 122 in a direction from the second isolated end 122b to the second coupled end 122a, and is output to the second coupled output port P2 via the third section 223 and the second section 222 of the subline 220 of the coupler 200.

Similarly, in the coupler 200, a first portion of a signal passed on the main line 210 from the inlet 210a to the outlet 210b is coupled to the first section 221 of the subline 220, thereby a first coupled signal is obtained on the first section 221. The first coupled signal is passed on the first section 221 in a direction from the first isolated end 221b to the first coupled end 221a, and is output to the first coupled output port P1 via the third section 123 and the first section 121 of the subline 120 of the coupler 100. Similarly, a second portion of the signal passed on the main line 210 from the inlet 210a to the outlet 210b is coupled to the second section 222 of subline 220 such that a second coupled signal is obtained on the second section 222. The second coupled signal is passed on the second section 222 in a direction from the second isolated end 222b to the second coupled end 222a and output to the second coupled output port P2.

By connecting the sublines of the couplers in series between the first coupled output port P1 and the second coupled output port P2, when an input signal is input at an inlet of any one of the couplers, a first coupled signal based on the input signal may be passed to coupled output port P1 and a second coupled signal based on the input signal may be passed to coupled output port P2. At least one of the first coupled output port P1 and the second coupled output port P2 may be coupled to an antenna calibration device, the antenna calibration device may acquire at least one of the two coupled signals based on the input signal. The coupled signal(s) may be used for calibration.

Some beamforming radios include a pair of calibration ports. Such radios may be configured to be used with antennas that likewise have two calibration ports. The calibration circuits in such antennas may, for example, be configured to couple a pair of calibration signals from each primary RF transmission path in the antenna (i.e., the RF transmission paths that extend between each port of the radio and respective sub-arrays of one or more radiating elements). Calibration may be performed in these radios based on, for example, the relative phases of the pair of calibration signals. Thus, there may be a need for calibration circuits that couple two (or more) signals from each primary RF transmission path. However, such calibration circuits may require significant room within the antenna, due to the large number of couplers included in the calibration circuit.

Referring again to FIG. 1, the second section 122 of the subline 120 of the first coupler 100 and the first section 221 of the subline 220 of the second coupler 200 are formed as a common segment 122(221). The common segment 122(221) couples the second isolated end 122b of coupler 100 to the first isolated end 221b of coupler 200. The third section 123 of the subline 120 is located between the first section 121 and the second section 122 and may connect the first isolated end 121b to the second isolated end 122b. The shape of the third section 123 is not particularly limited. In some embodiments, the electrical length of the third section 123 is designed such that its impedance satisfies the impedance matching requirements of the first coupling unit 101 and the second coupling unit 102. Thus, when a signal is input at the inlet 110a, the first coupled signal or the second coupled signal coupled from the main line 110 is passed to the first coupled end 121a or the second coupled end 122a, but there is substantially no energy passed at the first isolated end 121b or the second isolated end 122b and on the third section 123 between the two isolated ends.

By designing the couplers 100, 200 so that the respective third sections 123, 223 thereof will not pass substantial RF energy may ensure that the first and second coupled signals do not substantially interfere with each other.

In some embodiments, the main line 110 or the subline 120 may be any of a coaxial line, a rectangular waveguide, a circular waveguide, a stripline transmission line, a microstrip transmission line, or any other transmission line. Microstrip transmission lines may be particularly convenient in many applications due to their compact size and low cost. The coupling between the first section 121 of the subline 120 and the main line 110, and between the second section 122 of the subline 120 and the main line 110 may be achieved by various known coupling techniques including, but not limited to, pinhole coupling, parallel coupling, branch coupling, and matching double T. In some embodiments, the subline 120 and the main line 110 are microstrip transmission lines or stripline transmission lines with narrow-edge coupling to each other, so that the configuration of the coupling device is more compact. In some embodiments, there may be an interdigital structure 230 between the first section and the main line or between the second section and the main line of one or more of the plurality of couplers of the coupling device 1000, which may improve the coupling.

Figure 2:
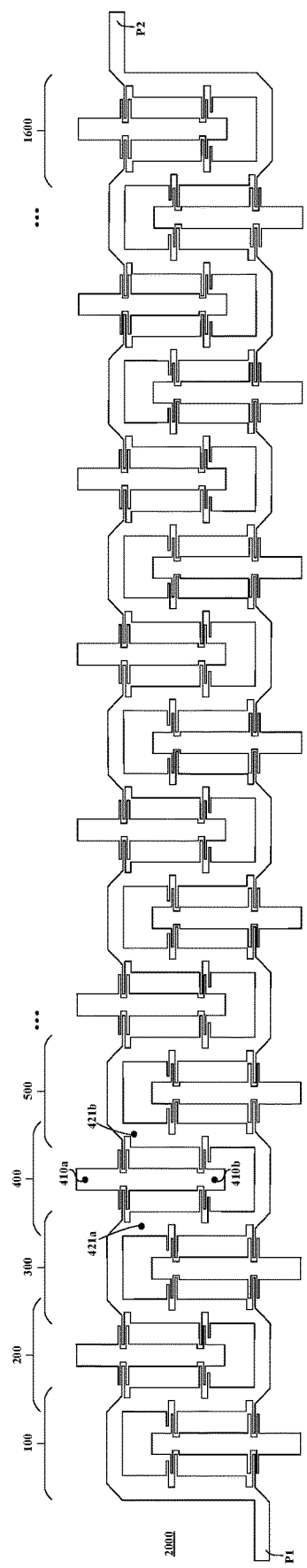
FIG. 2 schematically illustrates a configuration of a coupling device according to a further exemplary embodiment of the present invention.

An exemplary configuration of a coupling device 1000 including two couplers is shown in FIG. 1. Those skilled in the art will appreciate that a coupling device according to an embodiment of the present invention may include more couplers having similar structures and arranged in a similar pattern. For example, a coupling device 2000 according to further embodiments of the present invention that includes 16 couplers 100, 200 . . . 1600 is shown in FIG. 2. The coupling device 2000 may be used, for example, in an antenna having 16 radiating elements (or arrays of radiating elements), wherein each coupler corresponds to a respective one of the radiating elements (or arrays). For example, a signal for a first radiating element may be introduced into a first coupler corresponding to the first radiating element, and a calibration operation for the signal for the first radiating element may be performed according to an output signal output through one or both coupled output ports of the coupling device 2000. For simplicity, the couplers 100, 200 . . . 1600 below may be referred to collectively as "couplers". In other embodiments, the number of couplers may not be limited to 16 and may be less (e.g., 8) or more (e.g., 32).

Each of the couplers in the coupling device 2000 has a similar structure to the coupler 100 or 200 shown in FIG. 1. For example, when a signal is input from the inlet 410a of the coupler 400 in the coupling device 2000 and passed toward the outlet 410b, coupled signals are obtained at the coupled ends 421a and 421b of the coupler 400, respectively. The majority of the coupled signal at the coupled end 421a passes sequentially through the sublines of the couplers 300, 200, 100 to the first coupled output port P1; and the majority of the coupled signal at the coupled end 421b passes sequentially through the sublines of the couplers 500 . . . 1600 to the second coupled output port P2.

Figure 6A:
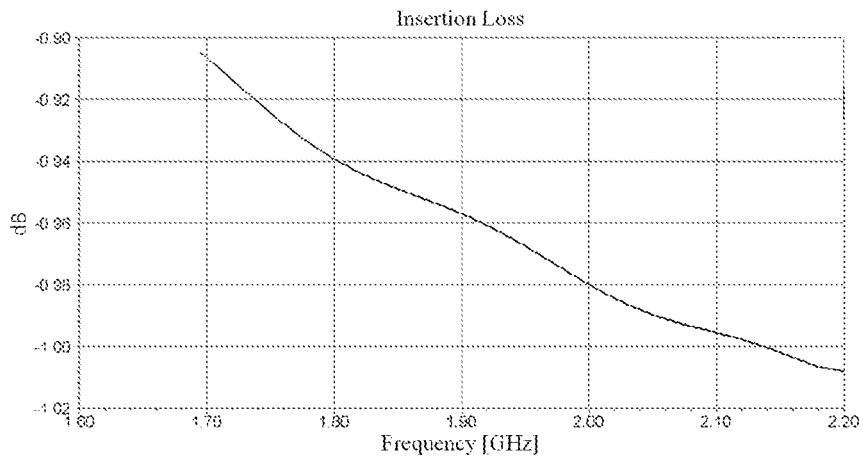
FIGS. 6A to 6C schematically illustrate simulated performance of a coupling device according to an exemplary embodiment of the present invention.
Figure 6B:
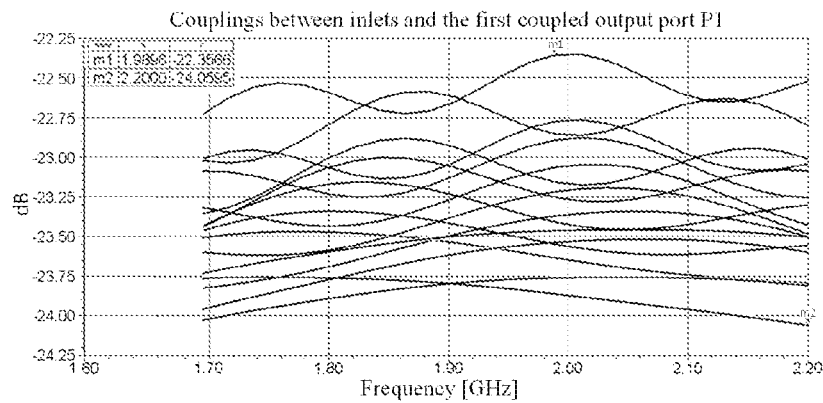
Figure 6C:
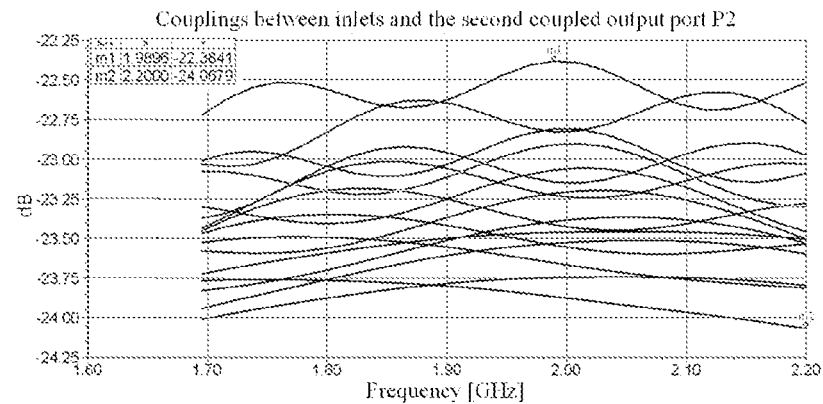
Figure 7:
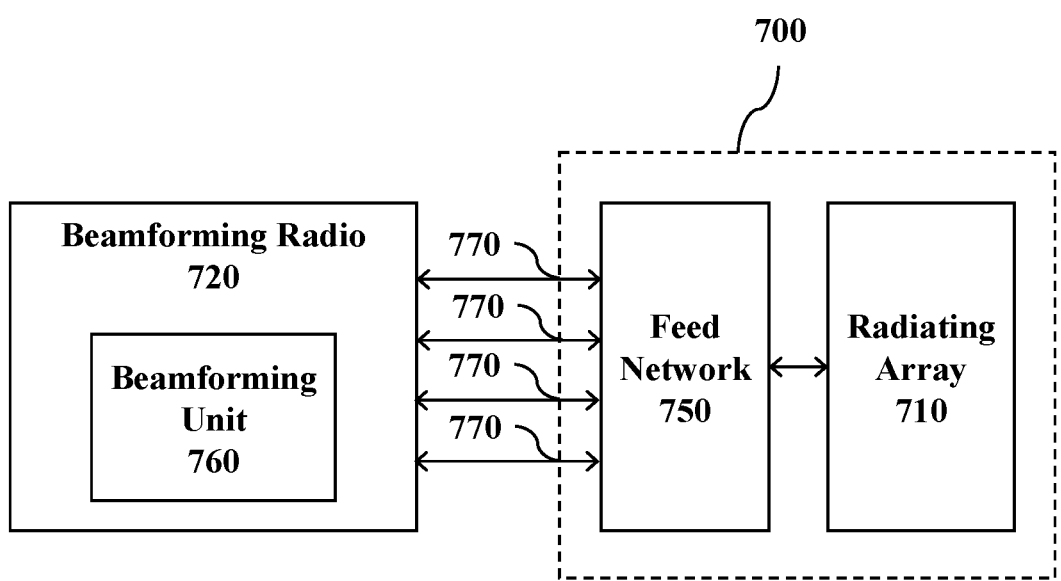
FIG. 7 schematically illustrates a configuration of a prior art antenna and connections thereto.

Simulation results for a specific example of the coupling device including 16 couplers are shown in FIGS. 6A to 6C. FIG. 6A shows the insertion loss between the first coupled output port P1 and the second coupled output port P2 as a function of frequency. As shown, the insertion loss is approximately −0.95 dB at 1.9 GHz. The coupling device according to an embodiment of the present invention may have better insertion loss performance as compared to a conventional coupling device having the same number of couplers due to the compact structure of the coupling device according to an embodiment of the present invention. In FIG. 6B, each curve represents a coupling from the inlet of each of the sixteen couplers to the first coupled output port P1, that is, the ratio of the intensity of the coupled signal output through the first coupled output port P1 for each coupler to the intensity of the input signal input to the inlet of the same coupler. In FIG. 6C, each curve represents a coupling from the inlet of each of the sixteen couplers to the second coupled output port P2, that is, the ratio of the intensity of the coupled signal output through the second coupled output port P2 for each coupler to the intensity of the input signal input to the inlet of the same coupler. Further, in FIGS. 6B and 6C, the point m1 having the largest coupling and the point m2 having the smallest coupling are marked, and the horizontal and vertical coordinate values of the points m1 and m2 are displayed on the figures respectively. It can be seen that the coupling between the two coupled output ports is relatively uniform, for example, the ranges of coupling are all between −22.4 dB and −24.1 dB. In addition, the variation ranges of the coupling of these couplers are also similar. For example, the difference between the points m1 and m2 in FIG. 6B is about 1.7 dB while the difference between the points m1 and m2 in FIG. 6C is about 1.68 dB. It should be understood by those skilled in the art that the specific performance parameters of the coupling device are related to the specific configuration of the coupling device. The simulation results in FIGS. 6A to 6C are taken as an example only for one specific configuration of the coupling device including 16 couplers, and do not limit the performance or configuration of coupling devices according to embodiments of the present invention.

In some embodiments, each coupler in the coupling devices illustrated in FIGS. 1 and 2 has a common segment in the subline with an adjacent coupler. In other embodiments, some couplers in the coupling device have common segments in the sublines with adjacent couplers, while other couplers are configured to have their own independent sublines. Such embodiments are also within the spirit and scope of the invention.

In addition, although the coupling device 1000 or 2000 including the couplers that are arranged on the same plane along a direction (e.g., a substantial linear direction) is illustrated in FIGS. 1 and 2, the present invention is not limited thereto. The couplers in the coupling device according to an embodiment of the invention may also be arranged in any one or more directions or be arranged in a three-dimensional configuration.

Figure 4:
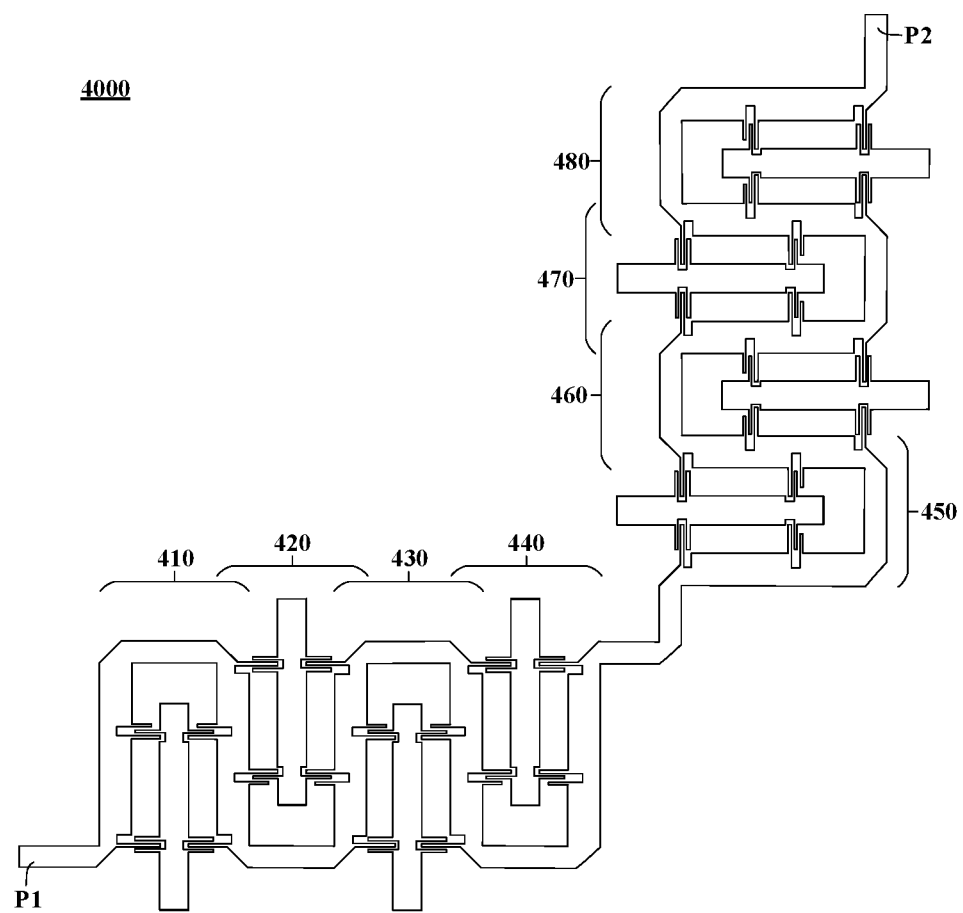
FIG. 4 schematically illustrates a configuration of a coupling device according to a further exemplary embodiment of the present invention.

As shown in FIG. 4, a plurality of couplers in a coupling device 4000 according to an embodiment of the invention may be disposed around a central region of the coupling device 4000. The coupling device 4000 includes 8 couplers arranged on the same plane, where the couplers 410, 420, 430, and 440 are arranged in a first direction, and the couplers 450, 460, 470, and 480 are arranged in a second direction. As shown, the first direction and the second direction are substantially perpendicular such that the 8 couplers are arranged in an L-shape around the central region of the coupling device 4000 and are connected in series between the two coupled output ports P1, P2. It should be understood by those skilled in the art that the coupling device 4000 illustrated in FIG. 4 is only an example, and that the coupling devices according to embodiments of the present invention may include fewer or more couplers. The arrangement of these couplers may also be at least a portion of a shape of triangle, quadrangle, another polygon, and ring, which are arranged around the central region of the coupling device and are connected in series between the two coupled output ports P1, P2.

Figure 5:
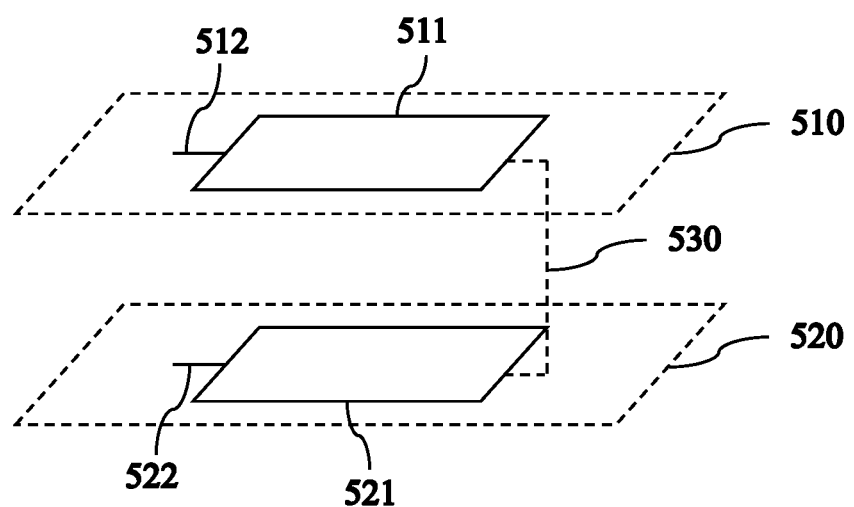
FIG. 5 schematically illustrates a configuration of a coupling device according to a further exemplary embodiment of the present invention.

As shown in FIG. 5, a coupling device 5000 according to an embodiment of the present invention may also have a multi-layered configuration. For example, a plurality of couplers in the coupling device may be divided into two sets, where the first set of couplers 511 is located in a first layer 510 and the second set of couplers 521 is located in a second layer 520, each of the first layer 510 and the second layer 520 being substantially parallel to a substrate of the coupling device 5000, and the first layer 510 and the second layer 520 having different heights in a direction perpendicular to the substrate. For example, in the case where the couplers in the coupling device 5000 are implemented using microstrip transmission lines, the first layer 510 and the second layer 520 may be printed circuit boards, the first set of couplers 511 and the second set of couplers 521 may be microstrip transmission lines formed on the printed circuit boards, and the substrate of the coupling device 5000 may be one of the printed circuit boards. In the case where the couplers in the coupling device 5000 are implemented by stripline transmission lines, the first layer 510 may be a plane on which the stripline transmission lines of the first set of couplers 511 are located, and the second layer 520 may be a plane on which the stripline transmission lines of the second set of couplers 512 are located, and the substrate of the coupling device 5000 may be a dielectric substrate located above or below the first layer 510 and the second layer 520. The coupled output ports of the coupling device may be located in the same layer (not shown) or may be located in different layers as shown in FIG. 5. For example, the first coupled output port P1 of the coupling device 5000 is located in the first layer 510, and the second coupled output port P2 is located in the second layer 520. In a coupling device 5000 having a multi-layer configuration, the coupling connection 530 between the first set of couplers 511 in the first layer 510 and the second set of couplers 521 in the second layer 520 may be implemented by various known coupling connection technologies, for example, a jumper cable or a via-hole (e.g., a via-hole through a PCB) conductor.

By utilizing these multi-layered configurations of these couplers, the configuration of the coupling device may be more compact to meet the requirement of miniaturization, and the configuration of the coupling device may be more flexible to meet various design requirements.

Figure 3:
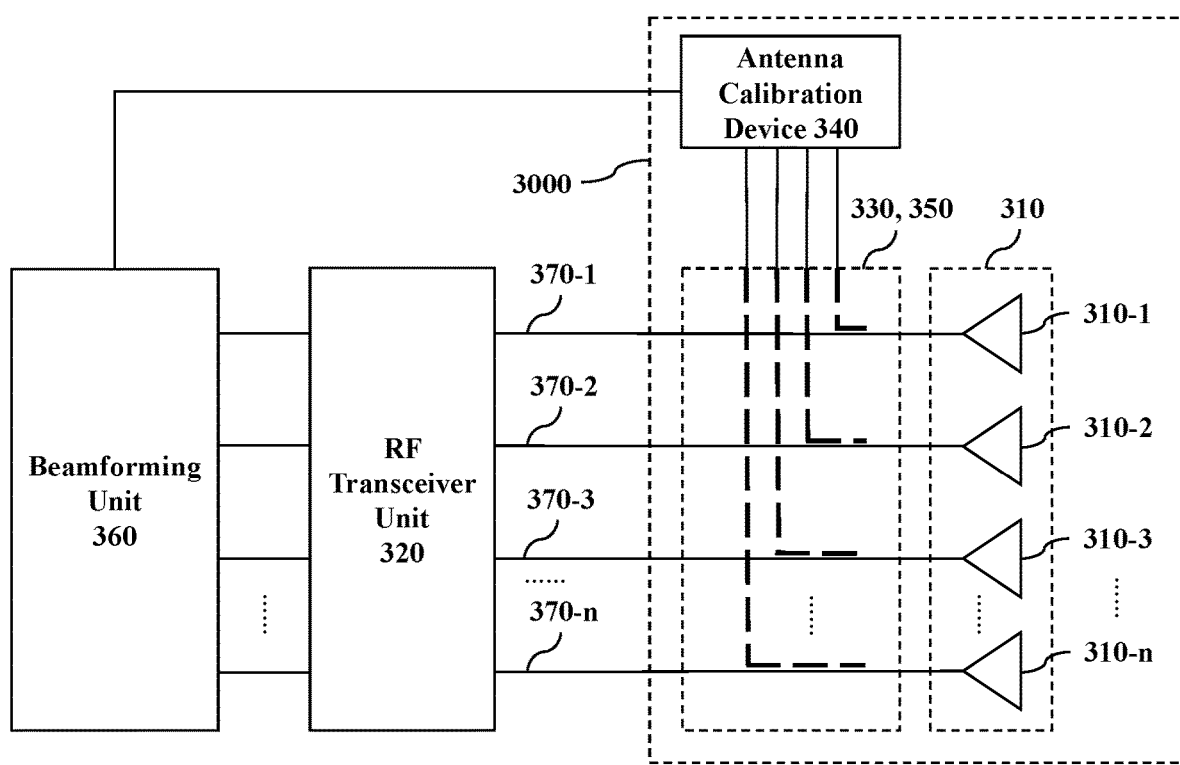
FIG. 3 schematically illustrates a configuration of an antenna and connections thereto according to an exemplary embodiment of the present invention.

Referring now to FIG. 3, a block diagram of an antenna 3000 and its connections according to an embodiment of the present invention is shown. As shown in FIG. 3, signals from the RF transceiver unit 320 and processed by the beamforming unit 360 enter the antenna 3000 through the RF ports 370-1, 370-2, 370-3, . . . , 370-*n*. The antenna 3000 includes a radiating array 310 having a plurality of radiating elements 310-1, 310-2, 310-3, . . . 310-*n* (which may each be individual radiating elements or arrays of radiating elements), a feed network 350 configured to feed sub-components of an RF signal to the radiating array 310, a coupling device 330 configured to couple portions of the sub-components of the RF signal that are fed to the radiating array 310 to an antenna calibration device 340, and the antenna calibration device 340 that is configured to calibrate the sub-components of the RF signal that are fed to the radiating elements in the radiating array 310. In the block denoted by the references 330 and 350 in FIG. 3, the thicker dashed lines schematically illustrate the coupling device 330, and the thinner solid lines schematically illustrate the feed network 350. Those skilled in the art will appreciate that the feed network 350 may have other functions in addition to the function of feeding the radiating array 310, such as changing the downtilt angles of the emitted signals of the antenna 3000 by a device such as a phase shifter (not shown).

Each of the radiating elements 310-1, 310-2, 310-3, . . . 310-*n* in the radiating array 310 may include a single radiating element or a plurality of radiating elements (e.g., a column or sub-column of radiating elements). Each of the radiating elements 310-1, 310-2, 310-3, . . . , 310-*n* performs radiation of transmitted signals and front end reception of received signals.

The coupling device 330 is a coupling device according to one of the above-described embodiments of the present invention. The inlets of one or more of the plurality of couplers of the coupling device 330 may be coupled to the RF transmission channels for one or more of the radiating elements 310-1, 310-2, 310-3, . . . , 310-*n*, respectively, and the first coupled output port P1 and the second coupled output port P2 of the coupling device 330 are coupled to the antenna calibration device 340 through, for example, first and second calibration ports on the antenna. Signals entering the coupling device 330 are passed to the antenna calibration device 340 through the first coupled output port P1 and the second coupled output port P2. The meaning of the RF signal transmission channel referred to herein is now explained taking the RF signal transmission channel corresponding to the radiating element 310-1 as an example. The RF signal transmission channel corresponding to the radiating element 310-1 refers to a transmission channel from the RF transceiver unit 320, sequentially through the RF port 370-1 and a portion of the feed network 350 for the radiating element 310-1, and to the radiating element 310-1. The RF signal transmission channels may correspond to the primary RF transmission paths referenced above.

The inlets of the couplers in the coupling device 330 may be coupled to the RF signal transmission channels for the respective radiating elements in any suitable manner. FIG. 3 shows a coupling manner in which the main lines of one or more couplers in the coupling device 330 are parallel and close to the transmission lines of the feed network 350 for the corresponding one or more radiating elements, thereby collecting the energies of the RF signals passed in the RF transmission channels. In these cases, the outlet of the main line of a coupler may be grounded through a matching load. It should be understood by those skilled in the art that the present invention is not limited to the case shown in FIG. 3, and the main line of a coupler may be a portion of an RF signal transmission channel from one of the RF ports 370-1, 370-2, 370-3, . . . 370-*n* to corresponding one of the radiating elements 310-1, 310-2, 310-3, . . . 310-*n*. For example, the main line of a coupler may be a segment of a transmission line for passing the RF signal in a corresponding RF signal transmission channel. In addition, the main line of a coupler may be coupled to at least one of the RF ports 370-1, 370-2, 370-3, . . . 370-*n*, the feed network 350, and the feeders for the radiating elements 310-1, 310-2, 310-3, . . . , 310-*n*, in another manner, such as by means of a power divider, a coupling element, a transmission line, and the like, as long as at least part of the energy of the signal passed on the RF signal transmission channel can be input to the coupling device 330.

When calibrating signals using the antenna 3000 as shown in FIG. 3, first, one of the plurality of RF ports of the RF transceiver unit 320, e.g., the RF port 370-1, is turned on, and other RF ports 370-2, 370-3 . . . 370-*n* of the plurality of RF ports are turned off, such that a first radio frequency signal is passed through the RF port 370-1 to the feed network 350 and be fed to the corresponding radiating element 310-1. Since the inlet of one of the couplers in the coupling device 330 is coupled to the RF signal transmission channel from the RF port 370-1 to the radiating element 310-1, a portion of the RF signal in the RF signal transmission channel enters the coupler in the coupling device 330. Second, a first coupled signal and/or a second coupled signal of the first RF signal from the first coupled output port P1 and/or the second coupled output port P2 of the coupling device 330 respectively are received by the antenna calibration device 340. Then, the antenna calibration device 340 calibrates the signal for the radiating element 310-1 based on the first coupled signal and/or the second coupled signal. For example, the antenna calibration device 340 may use parameters of the sum of the first coupled signal and the second coupled signal as parameters of the actual transmitted signal by the radiating element 310-1, and compare the parameters of the actual transmitted signal by the radiating element 310-1 with the parameters in the specification for the transmitted signal by the radiating element 310-1 to determine a difference between them. Then the difference is fed back to the beamforming unit 360, and the beamforming unit 360 adjusts the signal corresponding to the RF port 370-1 to compensate for the difference, such that the parameters of the actual transmitted signal by the radiating element 310-1 comply with the parameters in the specification.

In the above description, the antenna calibration device 340 uses both the first coupled signal from the first coupled output port P1 and the second coupled signal from the second coupled output port P2 for calibration. For example, for a single coupler, the first path from the first coupling unit to the first coupled output port P1 and the second path from the second coupling unit to the second coupled output port P2 may be different, which will introduce different amplitude/phase changes for the two signals passed on the respective two paths. However, for all couplers, the sum of the amplitude/phase change introduced by the first path and the amplitude/phase change introduced by the second path in one coupler is substantially the same as that in another. Taking the coupling device 2000 of FIG. 2 as an example, the sum of the amplitude/phase changes is approximately equal to the amplitude/phase change amount due to the electrical length of the sublines of the 16 couplers connected in series. Thus, the antenna calibration device 340 may use the sum of the first coupled signal and the second coupled signal for calibration. Moreover, those skilled in the art should understand that after the configuration of the coupling device has been determined, for each coupler, the amplitude/phase change introduced by the first path from the first coupling unit to the first coupled output port P1, and the amplitude/phase change introduced by the second path from the second coupling unit to the second coupled output port P2 are both determinable, and thus the antenna calibration device 340 may eliminate the amplitude/phase changes introduced by the first or second paths in the calibration algorithm, such that the antenna calibration device 340 may use at least one of the first coupled signal and the second coupled signal for calibration.

For the plurality of couplers in the coupling device, it is unnecessary to ensure that they have identical circuit structure, since the difference in circuit structures may be eliminated in the calibration algorithm by the antenna calibration device 340. According to the characteristics of signal propagation in the circuit structure of the embodiment of this disclosure, a person skilled in the art knows how to modify the calibration algorithm in the prior art. Details of the calibration algorithm will not be described here.

Although the number of the coupled output ports of the coupling device according to the embodiments of the present invention is two, those skilled in the art should understand that the coupling device may also have more coupled output ports, for example, more coupled output ports may be obtained by power dividers, coupling elements, etc.

Although some specific embodiments of the present invention have been described in detail with examples, it should be understood by a person skilled in the art that the above examples are only intended to be illustrative but not to limit the scope of the present invention. The embodiments disclosed herein can be combined arbitrarily with each other, without departing from the scope and spirit of the present invention. It should be understood by a person skilled in the art that the above embodiments can be modified without departing from the scope and spirit of the present invention. The scope of the present invention is defined by the attached claims.

That which is claimed is:

1. A coupling device for a base station antenna, comprising:
a first coupler that includes a first main line and a first subline, the first main line and the first subline including a first interdigitated structure that is configured to increase coupling between the first main line and the first subline; and
a second coupler that includes a second main line and a second subline, the second main line and the second subline including a second interdigitated structure that is configured to increase coupling between the second main line and the second subline,
wherein the first subline and the second subline share a common segment, and
wherein first interdigitated structure and the second interdigitated structure are formed in the common segment.

2. The coupling device of claim 1, wherein the first subline comprises a first section that is located on a first side of the first main line, a second section that is located on a second side of the first main line, and a third section that extends between the first and second sections of the first subline, and the second subline comprises a first section that is located on a first side of the second main line, a second section that is located on a second side of the second main line, and a third section that extends between the first and second sections of the second subline, wherein the second section of the first subline and the first section of the second subline comprise the common segment.

3. The coupling device of claim 1, wherein the first subline and the second subline are each part of a transmission line, the coupling device further comprising:
a first coupled output port at a first end of the transmission line; and
a second coupled output port at a second end of the transmission line.

4. The coupling device of claim 3, wherein the first main line forms a first coupling unit with the first section of the first subline and forms a second coupling unit with the second section of the first subline, and the first coupler is configured so that first coupled signals that are coupled to the first section of the first subline through the first coupling unit pass to the first coupled output port and are substantially isolated from the second coupled output port.

5. The coupling device of claim 4, wherein the first coupler is configured so that second coupled signals that are coupled to the second section of the first subline through the second coupling unit pass to the second coupled output port and are substantially isolated from the first coupled output port.

6. A coupling device for a base station antenna, comprising:
a first coupled output port;
a second coupled output port;
a first coupler that includes a first main line and a first subline that has a first section that is located on a first side of the first main line, a second section that is located on a second side of the first main line, and a third section at extends between the first and second sections of the first subline; and
a second coupler that includes a second main line and a second subline that has a first section that is located on a first side of the second main line, a second section that is located on a second side of the second main line, and a third section at extends between the first and second sections of the second subline;
wherein the first main line forms a first coupling unit with the first section of the first subline and forms a second coupling unit with the second section of the first subline, and the first coupler is configured so that first coupled signals that are coupled to the first section of the first subline through the first coupling unit pass to the first coupled output port and are substantially isolated from the second coupled output port.

7. The coupling device of claim 6, wherein the first coupler is configured so that second coupled signals that are coupled to the second section of the first subline through the second coupling unit pass to the second coupled output port and are substantially isolated from the first coupled output port.

8. The coupling device of claim 6, wherein the second section of the first subline and the first section of the second subline comprise a common segment that is configured to couple with both the first main line and the second main line.

9. The coupling device of claim 6, further comprising an interdigital structure between the first section of the first subline and the first main line.

10. The coupling device of claim 6, further comprising an interdigital structure between the second section of the first subline and the first main line.

* * * * *

UNITED STATES PATENT AND TRADEMARK OFFICE
CERTIFICATE OF CORRECTION

| | | |
|---|---|---|
| PATENT NO. | : 11,705,614 B2 | Page 1 of 1 |
| APPLICATION NO. | : 17/823442 | |
| DATED | : July 18, 2023 | |
| INVENTOR(S) | : Zhang et al. | |

It is certified that error appears in the above-identified patent and that said Letters Patent is hereby corrected as shown below:

In the Claims

Column 14, Line 42, Claim 6: delete "third section at extends between the first and second" insert --third section that extends between the first and second--

Column 14, Line 48, Claim 6: delete "a third section at extends between the first and second" insert --a third section that extends between the first and second--

Signed and Sealed this
Fifth Day of September, 2023

Katherine Kelly Vidal
*Director of the United States Patent and Trademark Office*